United States Patent Office 3,301,646
Patented Jan. 31, 1967

3,301,646
METHOD OF MAKING PARTIALLY STABILIZED ZIRCONIA
Thomas W. Smoot, Bethel Park, Pa., assignor to Harbison-Walker Refractories Company, Pittsburgh, Pa., a corporation of Pennsylvania
No Drawing. Filed June 12, 1963, Ser. No. 287,203
8 Claims. (Cl. 51—309)

This invention relates to improved polishing material and to improved methods of preparing ingredients for such polishing material. More particularly, this invention relates to high purity, partially stabilized zirconia glass polishing composition and methods of manufacture thereof.

Heretofore, zirconium oxide, cerium oxide and like materials have been employed in polishing glass, in some instances, being mixed with rouge for the purpose. Partially stabilized zirconia is presently used for polishing special glasses, such as the glass of the viewing screen of television tubes, high tolerance lenses, and other optical glasses, certain hard plastics and piezo-electric crystals. This stabilized zirconia polishing material must meet certain special requirements. For example, the individual particles must be less than 20 microns in diameter, since it has been proven that particles larger than this produce macro surface scratches.

Another desirable property of polishing composition is that the separate particles thereof be substantially equant. Still further, it is particularly important that little or no foreign phases be present in the compound having different degrees of hardness. The reason for this, of course, is clear, i.e. harder particles tend to scratch, softer particles are of no utility.

Accordingly, it is one object of this invention to provide partially stabilized zirconia polishing material of remarkably uniform particle size and, also, of remarkable uniform particle configuration.

Prior methods of manufacture of zirconia material, suitable for use as a polishing compound, or at least as the chief constituent of polishing compounds for treating glass and the like, have been expensive. For example, they have included extensive combinations of high firing temperatures, wet milling, and dry milling. The combination of milling steps was apparently required to obtain the necessary particle sizing. At least one prior worker has suggested special heat treatment to obtain a satisfactory polishing composition primarily comprised of zirconium oxide (zirconia). This latter method also appeared to require purification treatment, which included various washing steps, etc. Accordingly, it is an object of this invention to provide greatly simplified method of preparing zirconium oxide suitable for use as a glass polishing material. It is a further specific object of this invention to provide an improved method of preparing partially stabilized zirconium oxide suitable for use as a glass polishing material, which method includes but one heating step and no other treatment steps except cooling after said heating step.

Briefly, according to one aspect of this invention, I provide partially stabilized zirconia particles suitable for use as a polishing composition. This zirconia is preprepared as follows: A batch is prepared of about 100 parts, by weight, of high purity precipitated zirconium oxide; between 7 and 9 mole percent of zirconia stabilizing material (preferably selected from the group magnesia and calcium carbonate) is added to the 100 parts of zirconia (of course, the zirconia is in the unstabilized monoclinic form). These materials are thoroughly blended. All of the ingredients are smaller than 10 microns. Note the mixing is a dry mixing step.

The dry blended ingredients are placed in a suitable refractory container such as a periclase crucible, and set in a kiln. The kiln is heated to a temeprature above about 2050° F. and, preferably, 2100° F., which temperature is held for at least two hours. The kiln and contents are cooled and the dry ingredients are recovered from the crucible. This dry powder is zirconia, characterized by from 65 to 75 ±10% stabilization with no free stabilizing material detectable, microscopically. All particles fall between 12 microns and 0.1 micron in size with 90% of the particles being 2.5 ±1 micron in size.

Micron sizes refer to average particle diameter, the "diameter" of a given particle being its maximum diameter. Also when I say "partially stabilized," I refer to a batch in which some particles and materials are unstabilized and do not intend to infer that given molecules of zirconia are only partially stabilized.

It is thought a discussion of zirconia and its various chemical forms will be of use in a better understanding of the instant invention. Zirconia has the chemical formula $ZrO_2$. It can exist, under varying conditions, in three different crystalline forms; namely, the monoclinic, the tetragonal and the cubic. The monoclinic form usually exists up to about 1000° C., the tetragonal—between 1000 and 1900° C., and the cubic form exists from about 1900° C. to a melting point of about 2700° C. In a pure system, these crystal phase transformations are reversible, but these phase changes are always accompanied by an appreciable and undesired variation in density, volume, etc. Hence, although the cubic phase is desirable for many purposes and, in particular, for glass polishing purposes, it is distressingly unstable. Therefore, to use the otherwise desirable oxide, which cubic zirconia is, workers in the art produced what is termed "stabilized zirconia." Stabilized zirconia is zirconia substantially entirely exhibiting a cubic crystallite structure, the individual crystals of which are "propped," as it were, to prevent their crystallographic alteration and resulting disintegration at lower temperatures. For example, calcium oxide (calcia), yttrium oxide (yttria), magnesium oxide (magnesia) and cerium oxide (ceria) are usable to produce a stabilized zirconia material. Considering calcium oxide, for example, stabilization is brought about, in one method, by mixing from 3 to 6%, by weight (up to about 15 mole percent) of very finely divided, relatively pure calcium oxide (or a material yielding CaO at elevated temperatures) with from 97 to 94% of very finely divided zirconia. The mixture of calcium oxide and zirconia is heated to about 2900° F., and held at this temperature for a period of time sufficient to induce stabilization or "propping" of the cubic zirconia crystals, by way of a solid state interreaction between the two oxides; for example, two hours.

The material selected to stabilize the zirconia must have an ionic radius substantially the same as the ionic radius of the zirconium ion. The zirconium ion, in cubic configuration, has an ionic radius of about 0.87 angstroms. Calcium ions exhibit an average ionic radius of about 1.06 angstroms. Other materials, such as yttria, magnesia and ceria, which include ions having an average radius within ±20% of the 0.87 angstrom radius of the zirconia ion, are also usable. The stabilizing ions appear to enter the cubic structure of the zirconia, replacing, in part, zirconium ions. The minor differences in ionic radii involved in the substitutions apparently prevent the phase changes which take place in zirconia in the pure state.

The following examples are illustrative of the best modes now known to me for the practice of the invention. All parts and percentages are by weight, unless otherwise specifically mentioned. All sizing is in microns, unless otherwise stated. All chemical analyses are on the basis of an oxide analysis, in conformity with the conventional practices of reporting the chemical content of refractory materials.

Example I

One hundred parts of —10 micron zirconia are dry blended with about 3 parts of calcium carbonate and 1 part of magnesia. I suggest on the order of 10 minutes in a Clearfield mixer for the blending, although complete and thorough intermixing is visually determined by an operator, and can be a lesser or greater period of time. The mixed dry powders are placed in a refractory crucible. I suggest a periclase crucible of high purity (at least about 98% MgO). The crucible is placed in a kiln and fired to 2100° F., which temperature is held for six hours. The kiln is allowed to cool, and the crucible and contained dry powder are removed. These steps resulted in zirconia material, of about 60% stabilization.

Particle size distribution of the resulting powder was as follows: above 10 microns—none, 5 to 10 microns—less than 20%, between 3 and 5 microns—a negligible amount, the remainder between 2 and 3 microns.

Example II

The same as Example I, except the dry batch mixture is comprised of 100 parts zirconia, 1 part calcium carbonate and 3 parts magnesia.

Example III

The same as Example I, except the mixture of dry powders is comprised of 100 parts zirconia, 3 parts calcium carbonate and 1 part yttria.

Example IV

The same as Example I, except the dry batch mixture is comprised of 100 parts zirconia, 3 parts calcium carbonate and 1 part ceria.

Example V

The same as Example I, except the dry batch mixture is comprised of 100 parts zirconia, and between 7 and 9 mole percent of material capable of stabilizing the zirconia; but in which at least 1 mole percent of the stabilizing material is different from the rest of the stabilizing material.

I have found it essential that the stabilizing material be a mixture selected from that group usable to stabilize zirconia. If only one material is used, the temperature required to partially stabilize the zirconia is too high; and when recovered from the treatment process, I note sintering of the dry ingredients to produce particles much larger than desired, which particles must then be milled before they can be used as a glass polishing material. As a general rule, I find that if at least 1 mole percent of the 7 to 8 mole percent of the material used to stabilize the zirconia is different than the remaining 6 to 7 mole percent, I can obtain the desired stabilization at a much lower temperature, i.e., well below 2600° F., but above 2050° F. On the firing temperature, while I mention 2600° F. here, I do not suggest that high a temperature for best results; since it appears to be close to the point at which undesirable sintering agglomeration of the zirconia particles occurs. I prefer to stay between 2100 and 2300° F.

I suggest, in my preferred Example I above, on the order of 6 hours at the heat treatment temperature of 2100° F. As short a time as 2 hours is satisfactory, and as long as 10 hours at this temperature will also produce satisfactory results. The essential feature here is that the temperature selected be below that at which sintering will occur between the —10 micron zirconia particles, but will be high enough for desired solid-state reaction to occur between the zirconia and selected zirconia stabilizing agents. Obviously, the time selected is variable, but it must be long enough to obtain the desired degree of stabilization and utilization of all of the stabilizing agents added for this purpose, and it must be short of that time period which will result in sintering together of the zirconia particles.

For best results, I have found that for glass polishing, partially stabilized zirconia of this invention should be between 65 to 75±10% stabilized. Optimum results are found when the zirconia is 70±5% stabilized.

Exemplary analyses of the zirconia and CaO and MgO yielding stabilizing agents, usable for this invention, are as follows: The zirconia (metal to metal, parts per million)

| | |
|---|---|
| Hf | 120 |
| Fe | 200 |
| Ti | 28 |
| Si | 750 |
| Mg | 183 |
| B | 0.45 |
| Cr | 25 |
| Mn | 20 |
| Sn | 20 |
| Ni | 20 |
| Co | 5 |
| V | 20 |
| Cd | 0.3 |
| Ca | 1015 |
| Al | 30 |
| Mo | 20 |
| Pb | 20 |
| Loss on ignition | 0.7% |

$ZrO_2$, the remainder.

The CaO was added in the form of high purity calcium carbonate, i.e. $CaCO_3$, the total impurities being less than 0.6%, by weight. The MgO was furnished by magnesia, C.P. Grade, total impurities not exceeding 0.5%, by weight.

The ceria or yttria, etc. should also be of high purity. By "high purity" I mean ideally impurities amounting to less than about 1000 parts per million on a metal basis. With such high purity agents for stabilization, I am sure sintering will not occur below 2300° F., and am assured that optimum conditions exist at a firing temperature between 2100 and 2200° F.

Mineralogical examination of the dry particles, recovered from my process, was conducted. The particle size range was determined by microscopic techniques. It was found that all of the particles fell between 12 microns and 0.2 micron. Between 90 and 95% of the particles fell between 0.5 and 3.5 microns in size. Generally, however, I have found I can characterize my material as substantially all being smaller than 10 microns, with 90% being 2.5±1 micron. Individual particles are easily discernible, and are characterized by slightly elongate to equant, mostly rounded to well rounded shapes. There was remarkable particle homogeneity, although a few large crystallites were seen which were somewhat less rounded and more lath-like; whereas some very fine particles tended to be more angular. These crystallites, no doubt, resulted from some sintering, even at our preferred burning temperature.

In the above discussion, we mention calcia, magnesia, etc. as stabilizing agents. It is, of course, understood that any material which, on the basis of an oxide analysis, is mainly CaO, MgO, etc., is usable, as long as the material is convertible to these oxides below the stabilization temperature. For example, calcium carbonate, magnesium carbonate, etc. are usable; and, in point of fact, as noted, one of the stabilizing agents of Example I, above, was calcium carbonate.

Having thus described the invention in detail and with sufficient particularity as to enable those skilled in the art to practice it, what is desired to have protected by Letters Patent is set forth in the following claims.

I claim:
1. Method of making improved polishing material particularly suited for polishing glass and the like, which comprises the following steps: preparing a dry batch by intimately admixing high purity zirconium oxide, all of the particles of which are smaller than 10 microns, and a quantity of a mixture of agents for stabilizing the zirconia, the mixture of stabilizing agents for the zirconia equaling between 7 and 9 mole percent of zirconium oxide, all particles of the mixture of stabilizing agents being smaller than 10 microns, and at least 1 mole percent of said 7 to 9 mole percent being different than the other 6 to 8 mole percent of the mixture of stabilizing agents, subjecting said dry batch to a temperature between about 2050 and 2600° F., for a solid-state reaction to occur between said zirconium oxide particles and the mixture of stabilizing agents, maintaining the temperature for a time period sufficient to cause utilization of all of the mixture of stabilizing agents, cooling the batch and recovering partially stabilized zirconia for use as a polishing material all of the particles of which are less than about 10 mircons in size.

2. The method of claim 1 in which the stabilizing material is a mixture selected from the group consisting of calcia, magnesia, yttria and ceria.

3. The method of claim 1 in which said temperature is between 2100 and 2300° F.

4. The method of claim 1 in which said temperature is maintained for from 2 to 10 hours.

5. The method of claim 1 in which the stabilization agent is a mixture of calcium carbonate and magnesia.

6. The method of claim 5 in which the stabilizing agent is about 6 mole percent CaO and 1 mole percent MgO, both on the basis of an oxide analysis.

7. Method of making partially stabilized zirconia comprising preparing a dry batch by intimately admixing by weight about 100 parts of high purity zirconium oxide and a stabilizing agent consisting of 1 part CaO and 3 parts MgO, CaO and MgO being on the basis of oxide analysis, all particles of the mixture being smaller than 10 microns, subjecting the dry batch to an elevated temperature between about 2050 and 2600° F. so that a solid state reaction will occur between the zirconium oxide particles and the stabilizing agent, the temperature being below that at which sintering will occur between the zirconium oxide particles, maintaining the temperature for a time sufficient to cause utilization of all of the mixture of stabilizing agents and cooling the batch.

8. The method of claim 7 wherein the stabilization temperature is between about 2100 and 2300° F.

References Cited by the Examiner
UNITED STATES PATENTS

| | | | |
|---|---|---|---|
| 2,937,102 | 5/1960 | Wagner | 106—57 |
| 2,955,031 | 10/1960 | Bliton et al. | 51—309 |
| 3,071,455 | 1/1963 | Harman et al. | 51—309 |
| 3,222,148 | 12/1965 | Hay | 51—309 |

ALEXANDER H. BRODMERKEL, *Primary Examiner.*

D. J. ARNOLD, *Assistant Examiners.*